March 30, 1965
L. TITUS ETAL
3,175,889
APPARATUS FOR CONTINUOUS PRODUCTION OF MATERIAL
AT ELEVATED TEMPERATURES
Filed Feb. 2, 1962
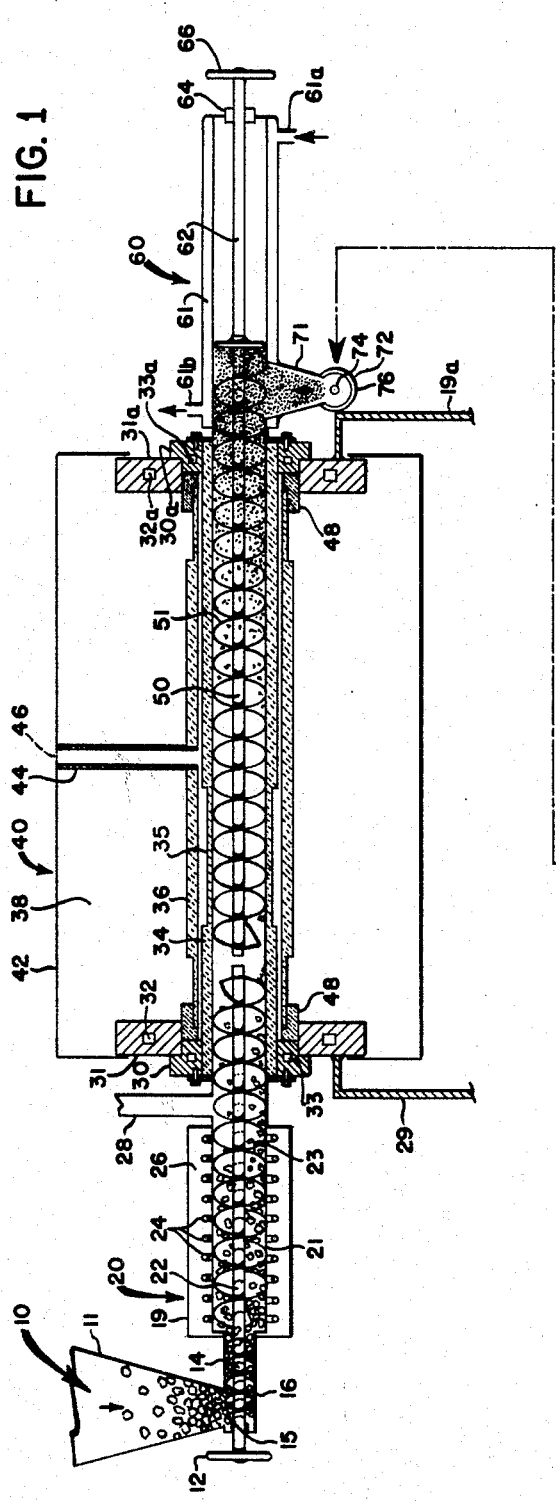
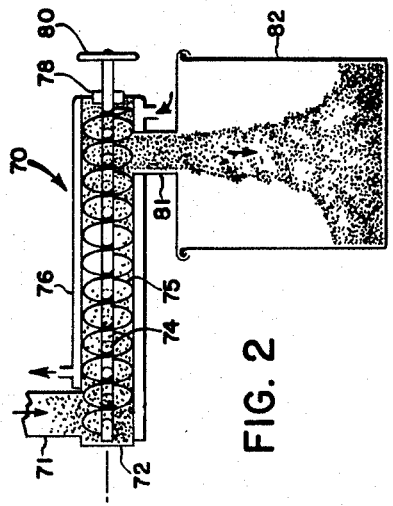
INVENTORS
LESLIE TITUS
DUDLEY J. ALDOUS
BY 3,175,889
APPARATUS FOR CONTINUOUS PRODUCTION OF MATERIAL AT ELEVATED TEMPERATURES
Leslie Titus, Campbell, and Dudley J. Aldous, San Jose, Calif., assignors to Kaiser Aluminum & Chemical Corporation, Oakland, Calif., a corporation of Delaware
Filed Feb. 2, 1962, Ser. No. 170,723
5 Claims. (Cl. 23—260)

This invention relates to a novel apparatus for accomplishing the continuous production of material resulting from chemical reactions at elevated temperatures. More particularly, the invention relates to a system for effecting the feeding, heating, cooling and discharge of materials, on a continuous basis. Still more particularly, the invention provides an apparatus to facilitate the continuous production of refractory hard metal powders.

The term "refractory hard metal" material as commonly known in the art refers to high melting, hard substances which have a metallic nature but are, however, technically inorganic compounds. "Refractory hard metal" materials include the refractory carbides, borides, nitrides, silicides of metals in the fourth to sixth groups of the periodic chart. Among the more important substances of this type are the carbides and borides of titanium, zirconium, niobium and tantalum and hafnium.

Various processes have been proposed for the production of refractory hard metal powders. Metal borides and carbides, for example, have been produced by combining reactants and subjecting them to the action of an electric arc. Other methods for producing these materials have included electrolysis of fused baths and the reactions between boron carbide or boron oxide and the refractory hard metal oxide with carbon to produce a boride and carbon monoxide.

Other reactions capable of performance on a commercial scale include the carbothermic reduction of the appropriate metal oxide to produce the carbide. These reactions which may be carried out at temperatures on the order of 2000° C. have been conducted in a variety of furnaces. One satisfactory procedure has been to employ a tubular, graphite resistance furnace through which graphite containers charged with shaped masses of reactant mixtures were passed. The purpose of using graphite containers is to contain the reactant mass during passage through the furnace and to protect the furnace components. While this procedure for producing refractory hard metal material powders is generally satisfactory for many situations there are objections resulting from the expense and rapid deterioration of the graphite cylinders or sleeves and the difficulty in obtaining complete reaction with reproducible uniform results. Moreover, mechanically complicated feed rate control and air trap devices necessary with such procedures are at times cumbersome.

The present invention provides an apparatus whereby a mixture of appropriate reactants for making refractory hard metals can be continuously passed through a reaction furnace without the use of feed sleeves or complicated feeding mechanisms and the resultant product can be continuously withdrawn within suitable protective enclosures.

The invention will be more fully described and explained by reference to the accompanying drawings wherein:

FIG. 1 is a side elevational view, partly in section, of the apparatus according to the invention, and FIG. 2 is a fragmentary view of the discharge assembly portion of the apparatus shown in FIG. 1.

As is seen in FIG. 1, the novel apparatus comprises reactant feeding section 10, preheater assembly 20, furnace 40 and cooling and product removal section 60.

Reactant feeding section 10 comprises a hopper 11 for receiving nodulized feed material. The hopper discharges the material into a tubular housing 16 containing choke feed mechanism 14. The choke feed mechanism 14 comprises a feed rate screw conveyor which is driven by drive sprocket 12 and has spiral blades 15.

Preheater 20 comprises an outer preheater shell 19 and an inner tubular housing 21 of somewhat larger diameter than tubular housing 16. Tubular housing 16 is contiguous with and connected to preheater 20. Tubular housing 21 of preheater 20 is surrounded by suitable heating elements 24. Thermal and/or electrical insulation 26 surrounds the heating elements and is disposed between tubular housing 21 and the preheater shell 19. Disposed within tubular housing 21 is the preheater screw conveyor 22. The choke feed screw 14 and preheater screw 22 are actually different sections of one coaxial shaft extending horizontally through the reactant feed mechanism and preheater. The spirally disposed blades 23 on the shaft in the preheater section are larger than the spiral blades 15 on the shaft in the feeding section. This arrangement permits a uniform and accurate predetermined rate of feed to be established. By maintaining the choke feed mechanism 14 in the tubular housing 16 at full capacity, a predetermined rate of feed material can be maintained. The size and pitch of the choke feed screw relative to the size of the preheater screw is designed to give approximately correct rate of feed advance through the preheater and furnace. It will be observed that the coaxial shaft 22 and blades 23 of the preheater screw mechanism terminate at a point within the furnace structure. The tubular housing 21 may be attached to the end of the furnace 40. A vent 28 is provided within the tubular housing 21 outside the furnace 40 for the removal of product gases.

The furnace 40 comprises an outer furnace shell 42, centrally disposed heating element 34 and insulating sheath 36. Water cooled aluminum terminal blocks 30 and 31 corresponding to 30a and 31a at the exit end of the furnace, surround and contact graphite heating element 34. Aluminum terminal blocks 31 and 31a are attached to bus 29 and to the end of furnace shell 42, and are electrically insulated therefrom. Aluminum terminal blocks 30 and 30a are removably secured to aluminum terminal blocks 31 and 31a and may be readily removed therefrom for furnace heater replacement. Aluminum terminal blocks 30, 30a, 31 and 31a are provided with annular channels 32, 32a, 33 and 33a for cooling. Refractory insulation 48 insulates the heater tube 34 from the sheath 36. Additional insulation 38 is disposed between the sheath 36 and the furnace shell 42. A graphite tube 44 is provided to extend through the furnace for the purpose of insertion of optical or pyrometric equipment for temperature measurement. A thermally resistant glass, e.g., Pyrex or quartz, enclosure 46 may be provided at the end of the tube 44. The graphite heating tube 34 has a section 35 of reduced cross-sectional area of graphite for the purpose of increasing resistance in that area and providing a zone of higher temperature within the furnace. The zone corresponding to the section of the heater tube of reduced cross-sectioned area therefore comprises the hottest portion of the furnace and consequently the reaction zone for most materials.

A furnace screw conveyor 50 extends through the seating element 34 and terminates at a point beyond the higher temperature zone in the area of reduced diameter. The amplitude of the spiral blades of the screw conveyor 50 is such as to provide a loose fit within tubular heating element 34 and the blades 51 ride on the bottom surface of heating element 34. The furnace screw 50 is advantageously made of graphite to withstand the high temperatures necessary in the reaction furnace. The coaxial central shaft of the furnace screw extends through the furnace into and through the cooling section 60 and is mounted and driven by drive sprocket 66. At the exit end of the furnace aluminum terminal blocks 30a and 31a of similar construction as terminal blocks 30 and 31 are mounted in the same manner with respect to the graphite heating element 34 and sheath 36 as described with respect to the terminal blocks at the feeding end of the furnace.

The cooling and product removal section 60 is disposed immediately adjacent and contiguous with the furnace 40 at the discharge end thereof. The cooling and product removal section 60 comprises a tubular water jacket 61 having a coolant inlet end at 61a and a coolant exit at 61b. A discharge hopper or closed chute 71 extends through the annular water jacket 61 so that reaction products removed by the screw conveyor 50 may be carried into the closed chute 71 for removal. The coaxially disposed shaft 62 of the furnace screw conveyor 50 extends through the cooling section 60 and is connected to a drive sprocket 66. A packing gland 64 and bearing is provided at the terminal end for the shaft 62 of the furnace screw drive 50.

The product discharge assembly 70 is shown in FIG. 2. As is seen, the product material discharges furnace 40 through hopper or closed chute 71 into a tubular housing 72 wherein is disposed a screw conveyor 74. The tubular housing 72 is provided with a water jacket 76 which surrounds the housing. Material withdrawn from discharge assembly 70 is carried by blades 75 of screw conveyor 74 toward the exit end of tubular housing 72 wherein it is permitted to fall through suitable enclosed tubular connecting section 81 into a canister or receptacle 82 which may be any product receiving drum or bucket. Coaxial shaft 74 of the screw conveyor passes through the bearing and packing gland 78 and is connected to a drive sprocket 80.

In utilizing the apparatus of the invention for the continuous production of refractory hard metal material, it has been discovered that the use of a nodulized feed material comprising blends of reactants in nodule form is most advantageous. As an illustration of the use of the apparatus to produce refractory hard metal material, $TiO_2$, $B_2O_3$, and carbon are combined in stoichiometric amounts according to the following reaction:

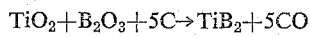

$$TiO_2 + B_2O_3 + 5C \rightarrow TiB_2 + 5CO$$

The mixture of reactants is blended with a small amount of kerosene as a binder material. By introducing the kerosene binder to the dried feed mixture during mixing in a standard blender, nodules of reactant mix may be obtained. Satisfactory nodules may be obtained by combining 28½ parts by weight of kerosene per 100 parts by weight of reactant feed mixture. The more rapid the mixing action during binder introduction the smaller the size of nodules which result. A preferred size of nodules which may be obtained by the above method is about −3 to +10 mesh, Tyler screen size. After nodulizing, the nodules of reactants are dried at a moderate temperature, e.g., 275° F., to remove the bulk of the kerosene. The dried nodules are then introduced in the feeding mechanism through the hopper in FIG. 1 where they are carried by blades 15 of feed screw 14 into the preheater section 20. The nodules are preheated to a temperature of 500 to 550° C. before entering the reaction furnace. The preheating hardens the nodules so that a minimum of dust results during handling and transporting of material through the furnace. The hardened, nodulized feed is advanced through the furnace at any desired linear rate which may, for example, be on the order of 5 inches per minute corresponding to a bulk rate of 12 pounds per hour and a rate of product removal of four pounds per hour. The preheated nodules are transported into the furnace by blades 23 or preheater screw 22. Furnace screw 50 receives the material within the furnace beyond the hot zone and carries the material by blades 51 through the hot zone 35 and remainder of the furnace. As described above, hot zone 35 is an area within the furnace surrounded by the resistor element having a portion of reduced cross-section and increased resistance. The nodulized reactants are heated to a temperature of 1950 to 2000° C. in the hot zone of the furnace. Most of the reactions occur in the hot zone and the products of reaction are transported by blades 51 of furnace screw 50 to the discharge end of the furnace, wherein the product is withdrawn through the discharge opening above hopper 71 and the product material allowed to fall into discharge assembly 70. Prior to discharge from the continual passageway, the materials are partially cooled by the water jacket 61 through which the material passes. The product material is further cooled upon discharge into assembly 70 by water jacket 76 maintained about a tubular housing 72 within the discharge assembly. The product, which in the above illustration is particulate titanium boride, is withdrawn by blade 75 of screw 74 in the discharge assembly 70 so that it may be loaded into canister or drum 82.

It is noted that the entire process may be conducted in the absence of air and in an enclosed system. The carbon monoxide gas product of the reaction serves as a protective atmosphere for the material during treatment. Moreover, the apparatus of the invention is capable of being used as a vacuum furnace or an inert atmosphere furnace. The use of protective sleeves or containers is unnecessary inasmuch as the entire apparatus can be operated as a closed system except for the withdrawal of product gases through outlets produced.

Should the terminal end of furnace screw 50 or 51 (the end which receives reactant material from the preheater screw 22 and 23) ever become clogged or jammed by virtue of the insufficient flowability of the material upon entering the heating zone, the furnace screws 50 and 51 may be retracted into the water-jacketed portion 61 of discharge assembly 60 for a distance sufficient to bring the end of the furnace screw into the hot zone 35. In this way, reactant materials adhering to the furnace screw will be heated to reaction temperature quickly and the furnace screw will be cleaned after which it can be restored to normal operating position for continual operation.

The apparatus of the invention has the additional advantage that it may be operated on a continual basis for an indefinite period of time, and the total operation may be halted only for replacement of apparatus components after normal wear and tear.

It is apparent that various changes and modifications may be made without departing from the invention and the scope of the invention is to be limited only by the appended claims wherein what is claimed is:

1. An apparatus for the continuous production of material resulting from chemical reactions at elevated temperatures comprising in tandem (1) feeding, (2) preheating, (3) furnace, and (4) cooling and product removal sections, a first centrally disposed shaft equipped with spirally disposed blade means extending from within said feeding section through said preheating section and terminating within said furnace section, said furnace section comprising a centrally disposed, longitudinally extending hollow resistance element having a portion of decreased cross-sectional area and increased resistance comprising the hot zone of said furnace section, said first mentioned centrally disposed shaft and spirally disposed blade means extending into said hollow resistance element of said furnace section and terminating before said hot zone of said furnace section, a second centrally disposed shaft equipped with spirally disposed blade means extending from beyond said hot zone through the hollow resistance element and into said cooling and product removal section disposed adjacent the exit end of said furnace section, both of said centrally disposed shafts equipped with spirally disposed blade means coacting to transport reactant and product material from said feeding section through said preheating and furnace sections into said cooling and product removal section, cooling means and receiving means within said cooling and product removal section adapted to cool and receive product material as it is transported out of the furnace section.

2. An apparatus for the continuous production of material resulting from chemical reactions at elevated temperatures comprising in tandem (1) feeding, (2) preheating, (3) furnace, and (4) cooling and product removal sections, a first centrally disposed shaft equipped with spirally disposed blade means extending from within said feeding section through said preheating section and terminating within said furnace section, the portion of said centrally disposed shaft extending into and through said preheating section being equipped with spirally disposed blade means having an amplitude larger than the amplitude of the spirally disposed blade means in said feeding section, said furnace section comprising a centrally disposed, longitudinally extending hollow resistance element having a portion of decreased cross-sectional area and increased resistance comprising the hot zone of said furnace section, said first mentioned centrally disposed shaft and spirally disposed blade means extending into said hollow resistance element of said furnace section and terminating before said hot zone of said furnace section, a second centrally disposed shaft equipped with spirally disposed blade means extending from beyond said hot zone through the hollow resistance element and into said cooling and product removal section disposed adjacent the exit end of said furnace section, both said centrally disposed shafts equipped with spirally disposed blade means coacting to transport reactant and product material from said feeding section through said preheating and furnace sections into said cooling and product removal section, cooling means and receiving means within said cooling and product removal section adapted to cool and receive product material as it is transported out of the furnace section.

3. An apparatus for the continuous production of material resulting from chemical reactions at elevated temperatures comprising (1) feeding, (2) preheating, (3) furnace, and (4) cooling and product removal sections, said feeding section comprising an elongated housing having reactant material receiving means and a centrally disposed coaxial shaft equipped with spirally disposed blade means, said preheating section being immediately adjacent and contiguous with said feeding section and having a centrally disposed elongated housing, said coaxial shaft of said feeding section extending coaxially through said elongated housing in said preheating section, the portion of said coaxial shaft extending into said preheating section being equipped with spirally disposed blade means having an amplitude greater than the amplitude of the spirally disposed blade means in said feeding section, said furnace section being adjacent to said preheating section and in tandem therewith, said furnace section comprising a centrally disposed, longitudinally extending, hollow resistance element having a portion of decreased cross-section and increased resistance comprising the hot zone of said furnace section, said coaxial shaft and spirally disposed blade means of said preheating section extending into said hollow resistance element of said furnace section and said coaxial shaft and spirally disposed blade means terminating before said hot zone of said furnace section, a second coaxially disposed shaft equipped with spirally disposed blade means extending from beyond said hot zone through the hollow resistance element and into said cooling and product removal section disposed adjacent the exit end of said furnace section, said coaxial shafts equipped with spirally disposed blade means coacting to transport reactant and product material from said feeding section through said preheating and furnace sections into said cooling and product removal section, cooling means and receiving means within said cooling and product removal section adapted to cool and receive product material as it is transported out of the furnace section.

4. An apparatus as in claim 3 wherein said second coaxial shaft and spirally disposed blade means which extend within the furnace section from beyond the hot zone, through the hot zone, and through said furnace section, is comprised of graphite.

5. An apparatus as in claim 3 wherein said preheating section is electrically heated.

References Cited in the file of this patent

UNITED STATES PATENTS

| 1,495,573 | Cantieny | May 27, 1924 |
| 2,768,277 | Buck et al. | Oct. 23, 1956 |
| 2,900,239 | Speed et al. | Aug. 18, 1961 |
| 3,007,690 | Koniewiez | Nov. 7, 1961 |
| 3,029,141 | Sibakin et al. | Apr. 10, 1962 |